(12) United States Patent
Ernst et al.

(10) Patent No.: US 9,014,486 B2
(45) Date of Patent: Apr. 21, 2015

(54) SYSTEMS AND METHODS FOR TRACKING WITH DISCRETE TEXTURE TRACES

(71) Applicants: Jan Ernst, Plainsboro, NJ (US); Maneesh Kumar Singh, Lawrenceville, NJ (US)

(72) Inventors: Jan Ernst, Plainsboro, NJ (US); Maneesh Kumar Singh, Lawrenceville, NJ (US)

(73) Assignee: Siemens Aktiengesellschaft, Munich (DE)

( * ) Notice: Subject to any disclaimer, the term of this patent is extended or adjusted under 35 U.S.C. 154(b) by 226 days.

(21) Appl. No.: 13/682,796

(22) Filed: Nov. 21, 2012

(65) Prior Publication Data

US 2013/0129229 A1    May 23, 2013

Related U.S. Application Data

(60) Provisional application No. 61/562,062, filed on Nov. 21, 2011.

(51) Int. Cl.

| | |
|---|---|
| *G06K 9/00* | (2006.01) |
| *H04N 5/225* | (2006.01) |
| *G06K 9/62* | (2006.01) |
| *G06K 9/46* | (2006.01) |
| *G06T 7/20* | (2006.01) |

(52) U.S. Cl.
CPC ............ *G06K 9/6201* (2013.01); *G06K 9/4671* (2013.01); *G06K 9/469* (2013.01); *G06T 7/2046* (2013.01); *G06T 2207/10016* (2013.01); *G06T 2207/30201* (2013.01)

(58) Field of Classification Search
None
See application file for complete search history.

(56) References Cited

U.S. PATENT DOCUMENTS

2010/0195870 A1* 8/2010 Ai et al. ........................ 382/103

OTHER PUBLICATIONS

Amer et at. "A Chains model for localizing PArticipants of group activities in videos", Computer vison ICCV, Nov. 6-13, 2011, pp. 786-793.*
Gall et al. "Hough Forests for Object detection, Tracking and Action Recognition", patter Analysis and MAchine Intelligence, IEEE Transaction on (vol. 33, Issue 11), Apr. 2011, pp. 2188-2202.*

* cited by examiner

*Primary Examiner* — Randolph I Chu

(57) ABSTRACT

An active set of discrete texture traces to a target point is determined in a first video frame and is applied to a second video frame to detect the target location in a second video frame. An estimate is made of the target location in the second video frame. A score map is computed of an area of locations. A location with a highest score in the score map is the new target location. If a threshold value is not met the active set of texture traces is stored. A score map for each of stored active sets is computed to determine the target location. If no score meets the threshold the target location in a previous video frame is made the current target location and a new active set of discrete texture traces is determined. Systems that implement the steps of the methods are also provided.

20 Claims, 12 Drawing Sheets

| Method | Average | board | box | lemming | liquor |
|---|---|---|---|---|---|
| PROST | 80.4 | 75.0 | 90.6 | 70.5 | 85.4 |
| MIL | 49.2 | 67.9 | 24.5 | 83.6 | 20.6 |
| FragTrack | 66.0 | 67.9 | 61.4 | 54.9 | 79.9 |
| ORF | 27.3 | 10.0 | 28.3 | 17.2 | 53.6 |
| GRAD | 88.9 | 94.3 | 91.8 | 78.0 | 91.4 |
| SPT | 95.2 | 97.9 | 94.8 | 88.1 | 100 |
| DTT | 95.5 | 99.3 | 93.1 | 91.4 | 98.0 |
| DTT one-shot | 86.6 | 96.4 | 77.3 | 81.3 | 91.4 |

| Method | lemming | box | board | liquor |
|---|---|---|---|---|
| PROST | 0.189 | 0.091 | 0.157 | 0.101 |
| MIL | 0.112 | 0.740 | 0.206 | 0.619 |
| FragTrack | 0.625 | 0.406 | 0.363 | 0.145 |
| ORF | 1.256 | 1.030 | 0.623 | 0.304 |
| GRAD | 0.215 | 0.093 | 0.059 | 0.054 |
| SPT | 0.101 | 0.073 | 0.059 | 0.016 |
| DTT | 0.094 | 0.110 | 0.050 | 0.023 |

| Method | david | girl | car | faceocc2 |
|---|---|---|---|---|
| PROST | 0.124 | 0.115 | n/a | 0.116 |
| TST | 0.052 | 0.131 | 0.065 | 0.139 |
| MIL | 0.127 | 0.161 | 0.700 | 0.095 |
| IVT | 0.059 | 0.147 | 0.020 | 0.081 |
| SPT | 0.026 | 0.066 | 0.031 | 0.065 |
| DTT | 0.033 | 0.105 | 0.022 | 0.045 |

FIG. 16

SYSTEMS AND METHODS FOR TRACKING WITH DISCRETE TEXTURE TRACES

STATEMENT OF RELATED CASES

The present application claims priority to and the benefit of U.S. Provisional Patent Application Ser. No. 61/562,062 filed on Nov. 21, 2011, which is incorporated herein by reference in its entirety.

TECHNICAL FIELD

The present invention relates to machine vision applying a representation of image patches that is invariant or quasi-invariant to image deformations.

BACKGROUND

The vision community has long sought to evolve representations of images or image patches that are quasi-invariant to transformations and to use them for a variety of problems like detection, recognition and tracking. The ability to establish correspondences between image patches under spatial deformations forms the basis of many approaches addressing machine vision problems.

In contrast to affine spatial deformations, not much focus has been directly targeted to the larger class (or a weaker constraint) of locally smooth deformations beyond the affine. Non-affine deformations may be caused by viewpoint changes under perspective projection, or transformations in imaged objects that are deformable or articulated. Object classes with large intraclass variations like bicycles, cars etc. can also be represented as archetypes with non-affine deformations. The application of non-affine deformations invariant image representations is thus very useful in machine vision, but is not widely applied or available. The application of non-affine deformations invariant image representations is desirable for highly precise online tracking of an object in video images.

Accordingly, improved and novel methods and systems that apply representations of image patches that are quasi-invariant to non-affine spatial deformations and that are applied in online tracking are required.

SUMMARY

In accordance with an aspect of the present invention systems and methods are provided for tracking an image of an object in a plurality of video frames by using discrete texture traces are provided.

In accordance with another aspect of the present invention, methods and systems for a discrete-domain approximation called Discrete Texture Traces (DTT) which is quasi-invariant to smooth spatial deformations are provided.

In accordance with an aspect of the present invention, a method is provided for tracking an image of an object in a plurality of video frames, comprising a processor determining in a first video frame in the plurality of video frames a set of discrete texture traces to a target location in the object in the first video frame to establish a reference model and the processor detecting the target location in a second video frame by maximizing a score based on the reference model.

In accordance with a further aspect of the present invention a method is provided, further comprising the processor updating the reference model based on the detected target location in the second video frame.

In accordance with yet a further aspect of the present invention a method is provided, wherein the score based on the reference model includes a relative number of discrete texture traces.

In accordance with yet a further aspect of the present invention a method is provided, further comprising the processor determining an estimate of the target location in the second video frame.

In accordance with yet a further aspect of the present invention a method is provided, further comprising the processor determining a location with a highest score in the second video frame by an iterative process as the target location in the second video frame.

In accordance with yet a further aspect of the present invention a method is provided, further comprising the processor determining a confidence map of a set of locations in a window around the estimate of the target location in the second video frame and the processor determining that a highest score in the confidence map does not meet a threshold requirement.

In accordance with yet a further aspect of the present invention a method is provided, further comprising the processor making the target location of a preceding video frame the target location of the second video frame and the processor determining a new set of discrete texture traces to the target location in the second video frame to establish a new reference model.

In accordance with another aspect of the present invention a method is provided for image tracking in a plurality of video frames, comprising determining a target location in a first video frame in the plurality of video frames, a processor extracting from an area in the first video frame with a defined size that includes the target location a set of discrete texture traces to the target location as an active set of discrete texture traces and the processor computing a score map of an area in a second video frame in the plurality of video frames based on the active set of discrete texture traces.

In accordance with yet another aspect of the present invention a method is provided, further comprising the processor determining as the target location in the second video frame, a location with a maximum score in the score map.

In accordance with yet another aspect of the present invention a method is provided, wherein the maximum score meets a threshold scoring value.

In accordance with yet another aspect of the present invention a method is provided, wherein no location in the score map meets a threshold scoring value.

In accordance with yet another aspect of the present invention a method is provided, further comprising the processor determining the target location of the first video frame as the target location of the second video frame, the processor storing the active set of discrete texture traces as a stored model and the processor determining a new active set of discrete texture traces related to the target location of the second video frame.

In accordance with yet another aspect of the present invention a method is provided, further comprising the processor computing a score map for the second video frame for each of one or more stored models and the processor updating the target location of the second video frame if the computed score map meets the threshold scoring value.

In accordance with yet another aspect of the present invention a method is provided, wherein the score map is a confidence map.

In accordance with yet another aspect of the present invention a method is provided, wherein the score map is created by an iterative process.

In accordance with a further aspect of the present invention a system is provided to track an image of an object in a plurality of video frames, comprising a memory to store data, including instructions, a processor enabled to execute instructions upon data retrieved from the memory to perform the steps determining in a first video frame in the plurality of video frames a set of discrete texture traces to a target location in the object in the first video frame to establish a reference model and detecting the target location in a second video frame in the plurality of video frames by determining a score based on the reference model.

In accordance with yet a further aspect of the present invention a system is provided, further comprising the processor enabled to update the reference model based on the detected target location in the second video frame.

In accordance with yet a further aspect of the present invention a system is provided, wherein the score based on the reference model includes a relative number of discrete texture traces.

In accordance with yet a further aspect of the present invention a system is provided, further comprising the processor enabled to determine an estimate of the target location in the second video frame.

In accordance with yet a further aspect of the present invention a system is provided, further comprising the processor enabled to determine a scoring map of a set of locations in an area around the estimate of the target location in the second video frame and the processor enabled to determine a location with a highest number of discrete texture traces in the scoring map as the target location in the second video frame.

DRAWINGS

Figure 8:
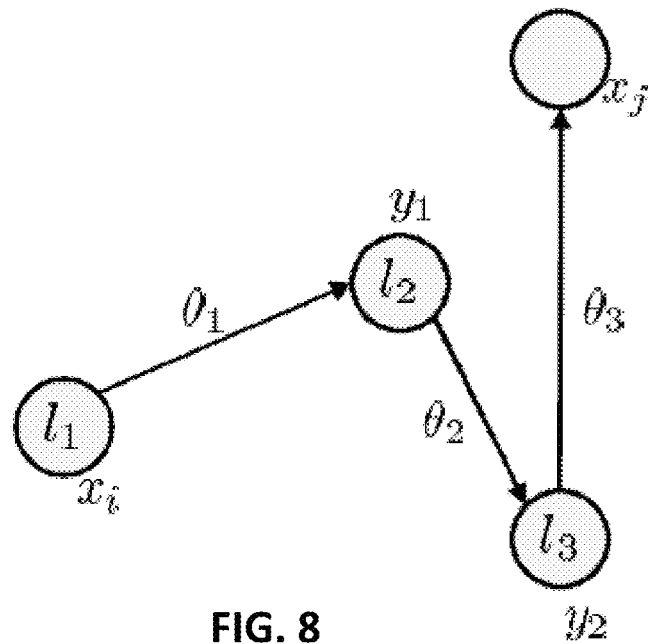
Figure 9:
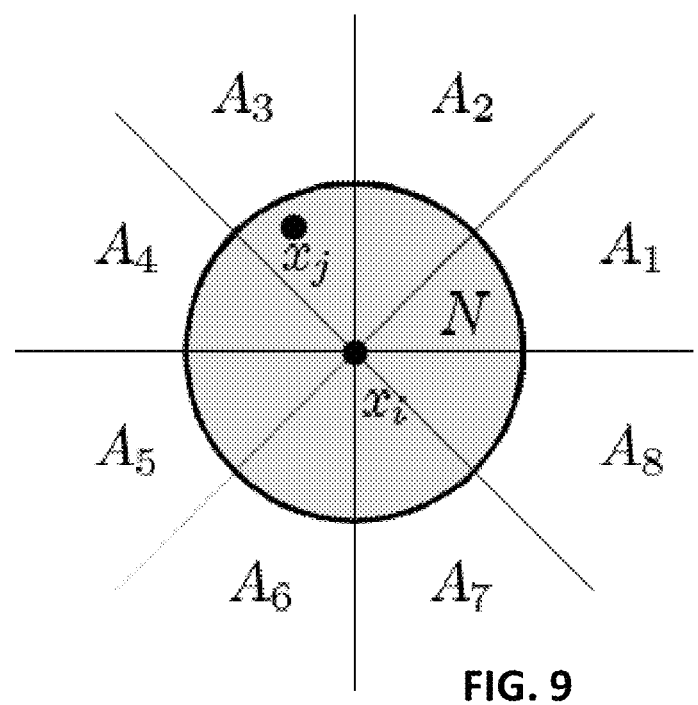
Figure 10:
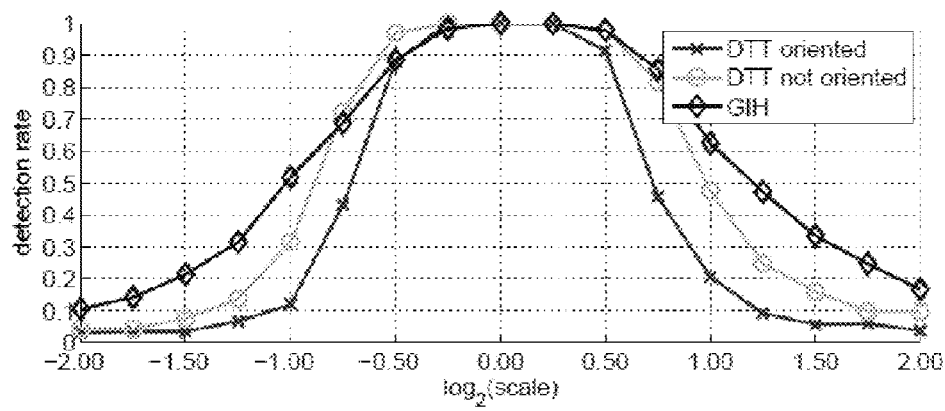
Figure 11:
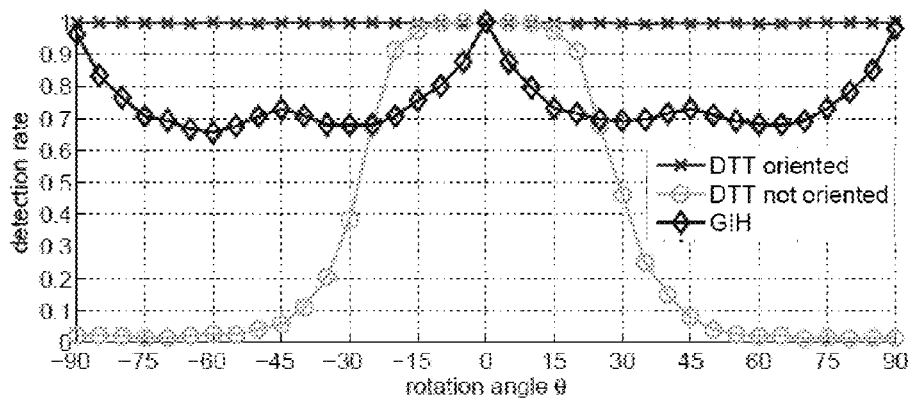
Figure 12:
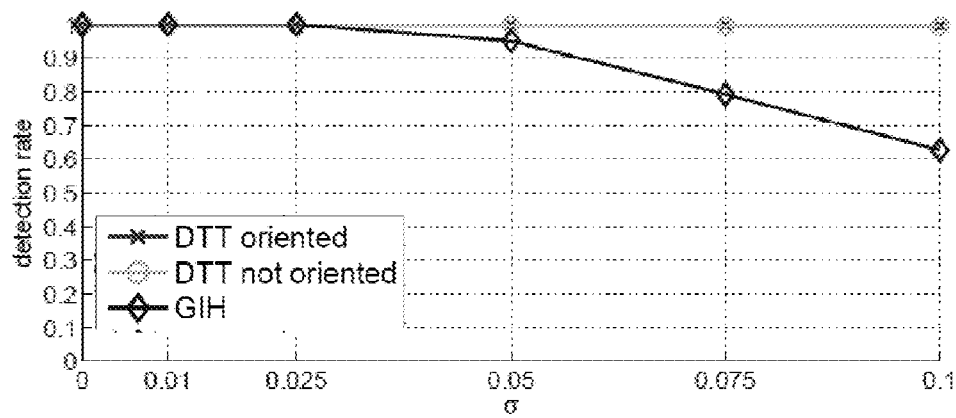
Figure 13:
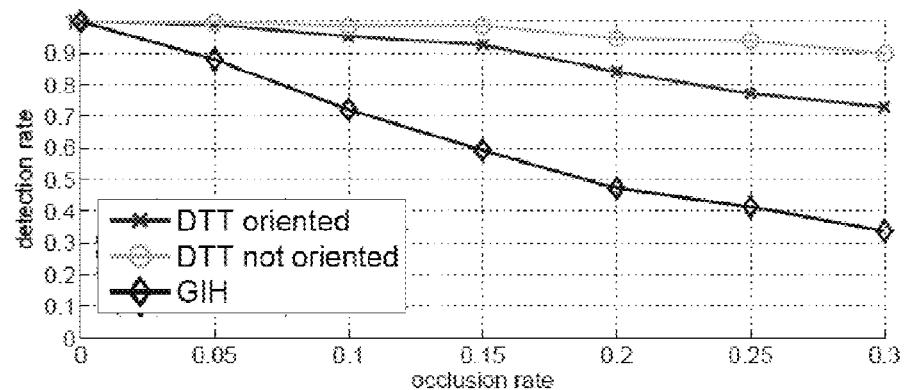
Figure 17:
Figure 18:
Figure 19:
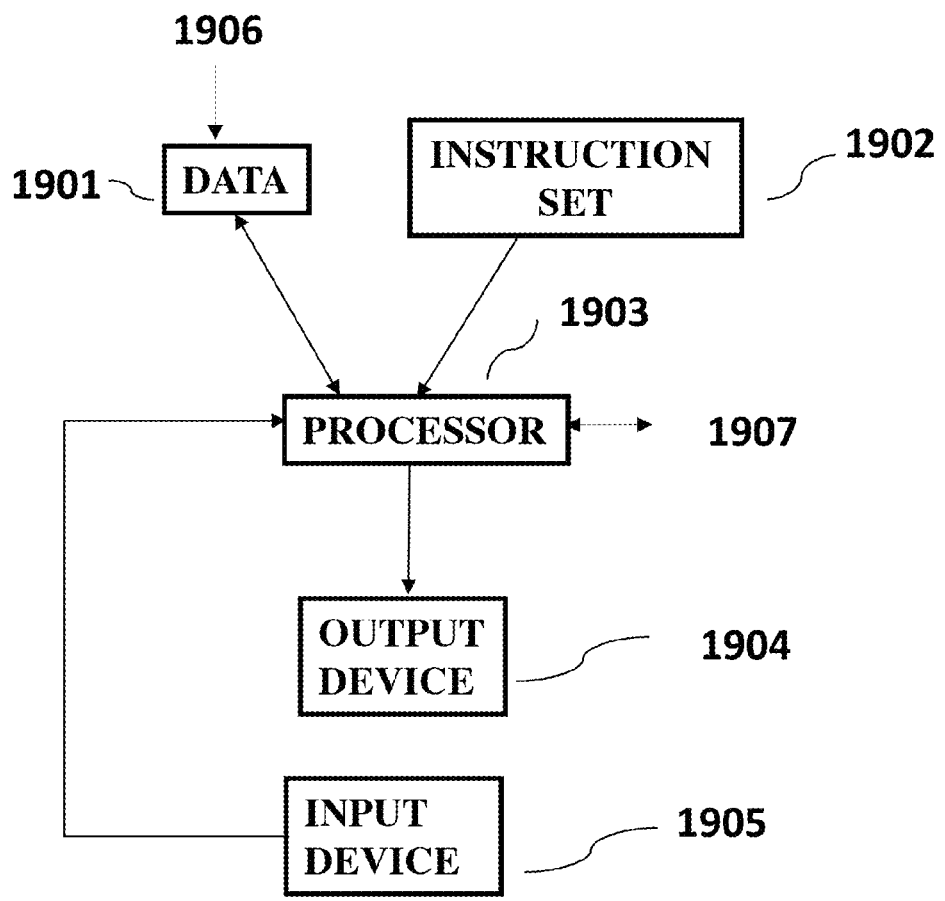

FIG. 8 also illustrates a trace in accordance with an aspect of the present invention;

FIG. 9 illustrates an angular relation in accordance with an aspect of the present invention;

FIGS. 10-16 illustrate performance of DTT methods provided in accordance with various aspects of the present invention;

FIGS. 17 and 18 illustrate a detected object and a corresponding confidence map in accordance with an aspect of the present invention; and FIG. 19 illustrates a processor based system or computer enabled to execute instructions to perform the DTT methods provided in accordance with various aspects of the present invention.

DESCRIPTION

Non-affine deformations are challenging image perturbations that arise in a variety of computer vision problems. They may be caused by viewpoint changes under perspective projection, or transformations in imaged objects that are deformable or articulated. Object classes with large intra-class variations like bicycles, cars etc. can also be represented as archetypes with non-affine deformations. The vision community has long sought to evolve representations that are quasi-invariant to such transformations and to use them for a variety of problems like detection, recognition and tracking. The ability to establish correspondences between image patches under spatial deformations forms the basis of many algorithms addressing the above problems.

In contrast to affine spatial deformations, not much focus has been directly targeted to the larger class (or a weaker constraint) of locally smooth deformations beyond the affine.

Figure 2:
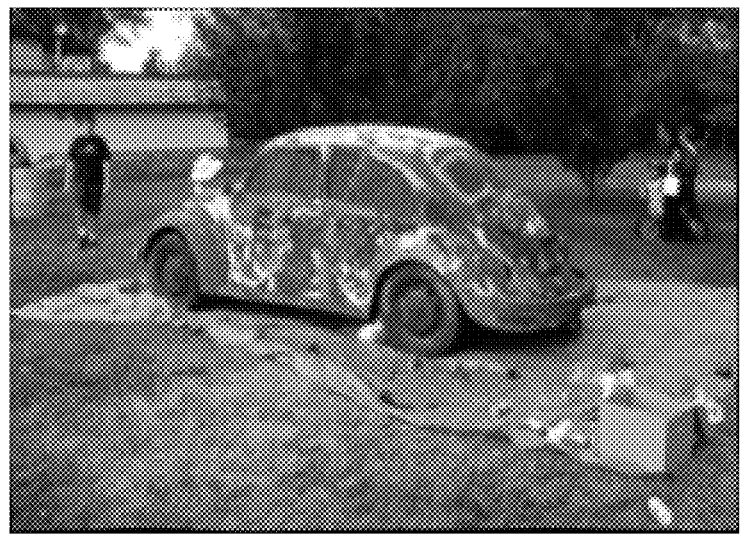
FIGS. 2-5 illustrate image perturbation.
Figure 3:
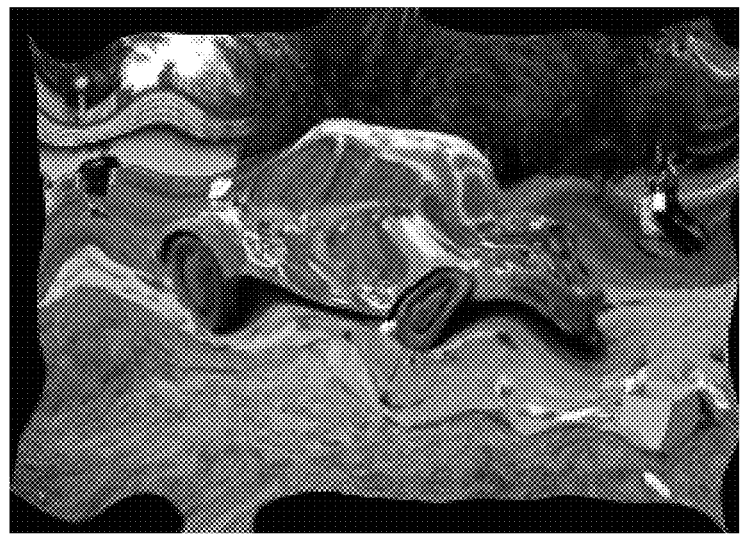
Figure 4:
Figure 5:
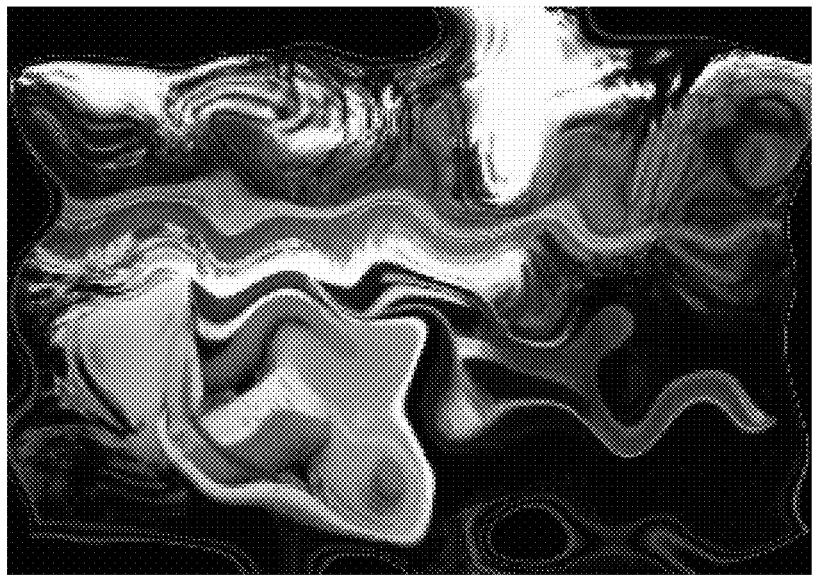

FIGS. 2-5 show synthetic examples for such deformations. Example perturbations for the controlled experiments are illustrated in FIGS. 3 and 5. The reference images in FIG. 2 and FIG. 4 are smoothly perturbed to FIG. 3 and FIG. 5, respectively, with a noise amplitude of 20 for FIG. 3 and a noise amplitude of 40 for FIG. 5.

Fundamentally, most representations are explicitly or implicitly based on the notion of the Euclidean distance in the image domain. An image patch is often modeled as a distribution of atomic image elements in particular spatial arrangements. Popular methods such as SIFT and shape context fall into this category as they essentially capture marginal distributions of edges in certain spatial configurations. For non-affine deformations the Euclidean distance becomes less meaningful, especially over larger scales. While Euclidean distances may change arbitrarily under smooth deformations, the topology of the image is preserved, i.e. the local neighborhood structure does not change.

Following are listed some aspects of the present invention as provided herein: (1) A novel, deformation-invariant patch representation based on the preservation of topology is provided in accordance with an aspect of the present invention. This is done in two steps: (a) Expression of the relative location of two arbitrary points in the image domain in a deformation invariant manner is provided as an aspect of the present invention, not by their Euclidean distance, but by their topological connectedness; and, (b) A patch model is provided in accordance with an aspect of the present invention, conditioned on its center or target location as the set of all image locations that have a particular topological connectedness to the center or target. (2) A voting-based patch representation is provided in accordance with an aspect of the present invention that is efficient to compute and has good performance under occlusion and deformation.

Also, an evaluation is provided of the herein provided representation for the keypoint matching problem for synthetic and realistic benchmarks and a comparison is provided with popular models like affine-SIFT and geodesic intensity histograms (GIH) as for instance provided in "[12] Haibin Ling and David W. Jacobs. Deformation invariant image matching. In ICCV 2005, volume 2, pages 1466-1473, 2005." A performance evaluation of GIH under thorough controlled spatial deformations is believed to be provided for the first time, herein.

Computing feature descriptors that are invariant to geometric transformations (for example, induced by viewpoint changes, etc.) have been addressed in a variety of ways. A popular stream of work is to estimate local parametric models of subsets of projective transforms, such as scale as described in "[16] K. Mikolajczyk and C. Schmid. Indexing based on scale invariant interest points. In ICCV 2001, volume 1, pages 525-531 vol. 1, 2001", "[13] David G. Lowe. Distinctive image features from scale invariant keypoints. Int. J. Comput. Vision, 60(2):91-110, 2004" and "[11] Tony Lindeberg. Feature detection with automatic scale selection. Int. J. Comput. Vision, 30(2):79-116, 1998" and affinities as described in "[17] Krystian Mikolajczyk and Cordelia Schmid. Scale & affine invariant interest point detectors. Int. J. Comput. Vision, 60(1):63-86, 2004", "[15] J. Matas, O. Chum, U. Martin, and T. Pajdla. Robust wide baseline stereo from maximally stable extremal regions. In BMVC, volume 1, pages 384-393, London, 2002", "[8] T. Kadir, A. Zisserman, and M. Brady. An affine invariant salient region detector. pages Vol I: 228-241, 2004" and "[19] Tinne Tuytelaars and Luc Van Gool. Matching widely separated views based on affine invariant regions. Int. J. Comput. Vision, 59(1):61-85, 2004" based on the flat surface assumption.

Several approaches treat feature detection and computation of the invariant feature descriptor as a single step as described in "[4] S. Belongie, J. Malik, and J. Puzicha. Shape matching and object recognition using shape contexts. IEEE PAMI, 24(4):509-522, April 2002" and "[18] Dennis Tell and Stefan Carlsson. Wide baseline point matching using affine invariants computed from intensity profiles. In ECCV 2000, pages 814-828, London, UK, 2000. Springer-Verlag", or normalize with respect to a partial model and then capture the residual perturbations in the feature descriptor as described in "[13] David G. Lowe. Distinctive image features from scale invariant keypoints. Int. J. Comput. Vision, 60(2):91-110, 2004" and "[3] Herbert Bay, Andreas Ess, Tinne Tuytelaars, and Luc Van Gool. Speeded-up robust features (surf). Comput. Vis. Image Underst., 110:346-359, June 2008."

In "[5] Hong Cheng, Zicheng Liu, Nanning Zheng, and Jie Yang. A deformable local image descriptor. In Computer Vision and Pattern Recognition, 2008. CVPR 2008. IEEE Conference on, pages 1-8, 2008" the authors combine multiple support regions into a classification scheme. Similarly, affine keypoint matching has been addressed by learning approaches as described in "[2] B. Babenko, P. Dollar, and S. Belongie. Task specific local region matching. In Computer Vision, 2007. ICCV 2007. IEEE 11th International Conference on, pages 1-8, 2007" and "[10] V. Lepetit and P. Fua. Keypoint recognition using randomized trees. Pattern Analysis and Machine Intelligence, IEEE Transactions on, 28(9): 1465-1479, 2006."

One difference of the approach as provided herein in accordance with an aspect of the present invention to these methods is that a parametric model of the projection or surface geometry is not assumed, apart from smoothness of the deformation. An important consequence of this is that a quasi-invariant descriptor can be computed at any textured point in the image, without requiring the detection of keypoints as a first step. Nevertheless, due to the ubiquity of these methods the SIFT method is applied as a representative in the experimental validation of the approach provided in accordance with an aspect of the present invention.

The goal of computing patch descriptions invariant to more general deformations—smooth and non-parametric, has received much less attention. In "[12] Haibin Ling and David W. Jacobs. Deformation invariant image matching. In ICCV 2005, volume 2, pages 1466-1473, 2005" the authors pose the problem into a framework based on geodesic distances in the image. Their approach considers deformations as homeomorphism between images under affine illumination and yields a normalization that is defined up to an arbitrary angular deformation.

While the approach as provided herein in accordance with an aspect of the present invention shares similar assumptions it follows a very different way of incorporating the deformation invariance. It will be shown herein experimentally that this becomes relevant when there is larger intra-class variation in object appearance, as compared to the geodesic distance method.

A recent approach that is related in spirit is the chains model of "[9] L. Karlinsky, M. Dinerstein, D. Harari, and S. Ullman. The chains model for detecting parts by their context. In Computer Vision and Pattern Recognition (CVPR), 2010 IEEE Conference on, pages 25-32, 2010." The authors model the location of an object part in the image conditioned on contextual information and based on a labeled image corpus. This chains model addresses the detection of a location given a previously learned model from data, but no tracking or incremental tracking is provided. Furthermore, the Karlinsky model evaluates in chain in a probabilistic manner, which is different from the texture trace or discrete texture trace model which are deterministic. One aim of the approach provided herein in accordance with an aspect of the present invention is to construct an invariant patch representation from a single image and not a probabilistic chain model.

In "[20] A. Vedaldi and S. Soatto. Features for recognition: Viewpoint invariance for non-planar scenes. In ICCV 2005, volume 2, pages 1474-1481, 2005" the authors present a method to design specific operators that exhibit the desired invariances. They show results for an operator based on straight edge segments on surface discontinuities. In the approach provided in accordance with an aspect of the present invention the knowledge of a particular underlying image structure is not required, but the representation is automatically computed from the image patch with weaker assumptions on the involved transformations.

Landmark-based non-linear rectification is a common scheme in single- and multi-modal image registration as described in "[21] Barbara Zitová and Jan Flusser. Image registration methods: a survey. Image Vision Comput., 21(11):977-1000, 2003." The approach provided herein in accordance with an aspect of the present invention distinguishes by not requiring the global transformations involved to be parametric nor is it needed to explicitly estimate such transformations.

Similarly, earlier approaches tried to separately estimate the curvature of the underlying surface from texture in a monocular image which then can be used to provide a spatial normalization as described in "[14] Jitendra Malik and Ruth Rosenholtz. Computing local surface orientation and shape from texture for curved surfaces. Int. J. Comput. Vision, 23(2):149-168, 1997", "[7] Jonas Gårding and Tony Lindeberg. Direct computation of shape cues using scale-adapted spatial derivative operators. Int. J. Comput. Vision, 17(2): 163-191, 1996" and "[1] J. Aloimonos. Shape from texture. Biol. Cybern., 58(5):345-360, 1988." In contrast, the approach provided herein in accordance with an aspect of the present invention does not explicitly rely on inferring or reconstructing the underlying geometrical transformations of the surface as an intermediate step.

Continuous Profile Traces

This section outlines an approach in accordance with an aspect of the present invention and followed in the rest of the development. For clarity of exposition the approach provided herein is first motivated in a continuous domain. A discrete approximation that is enabled to be implemented on a processor or a computer with a processor is presented in a later section herein.

Figure 6:
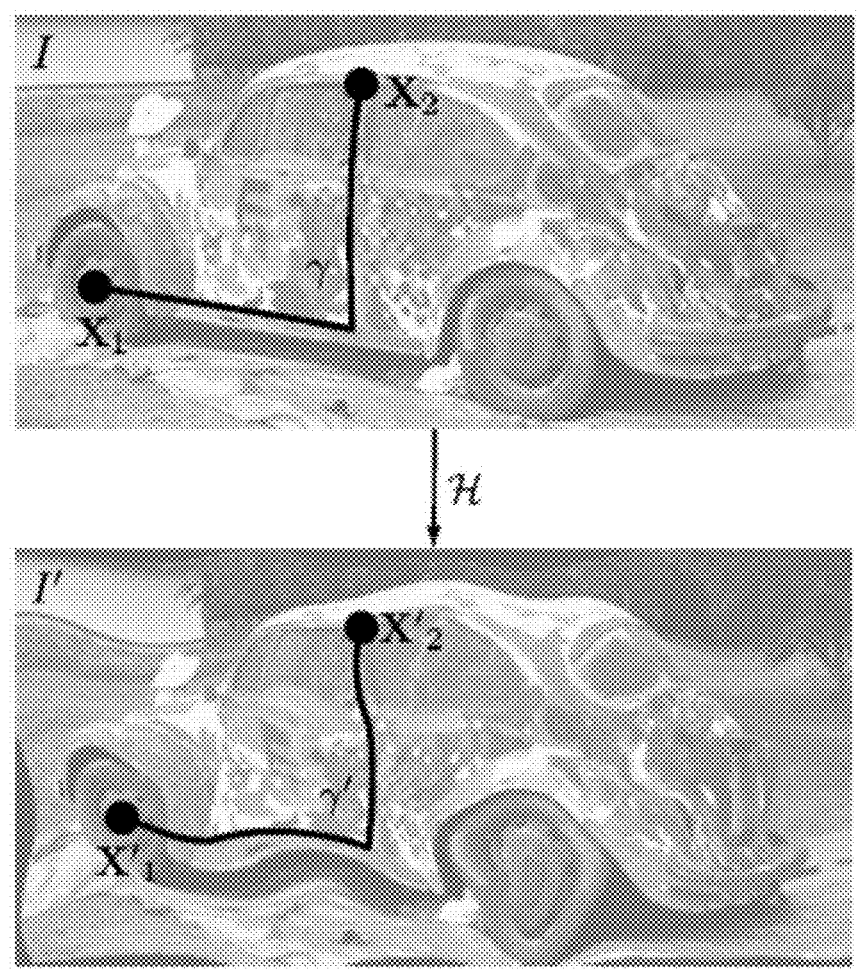
FIG. 6 illustrates spatial deformation in accordance with an aspect of the present invention.

The approach is started by looking at two locations $X_1$, $X_2 \in \square^2$ in images of a scene under a locally varying spatial deformation H as shown in FIG. 6. Herein an image I is spatially deformed by a homeomorphism H. The points $X_1$ and $X_2$ are mapped into $X'_1$ and $X'_2$, and the spatial curve γ is mapped into γ'. These deformations may stem from projective effects between a stereo image pair, non-rigid deformations of natural objects over time, intra-class variation of similar objects, etc.

The approach provided herein in accordance with an aspect of the present invention is to model the location $X_2$ by describing how to get there from $X_1$ in a manner that depends on the image texture and is invariant to local deformations. Instead of defining $X_2$ by a Euclidean (difference) vector from $X_1$, it is declared in the same fashion one may use to follow directions in an unknown city of the following sort: "To arrive at your destination from your current location, follow the road until you see a church on your right. Make a left at the next traffic light and drive until a roundabout. Take the second exit . . . " and so on. This kind of guidance is of a topological nature and (largely) invariant to smooth deformations of the underlying space and quantitative knowledge of the underlying metric is not necessary.

Figure 7:
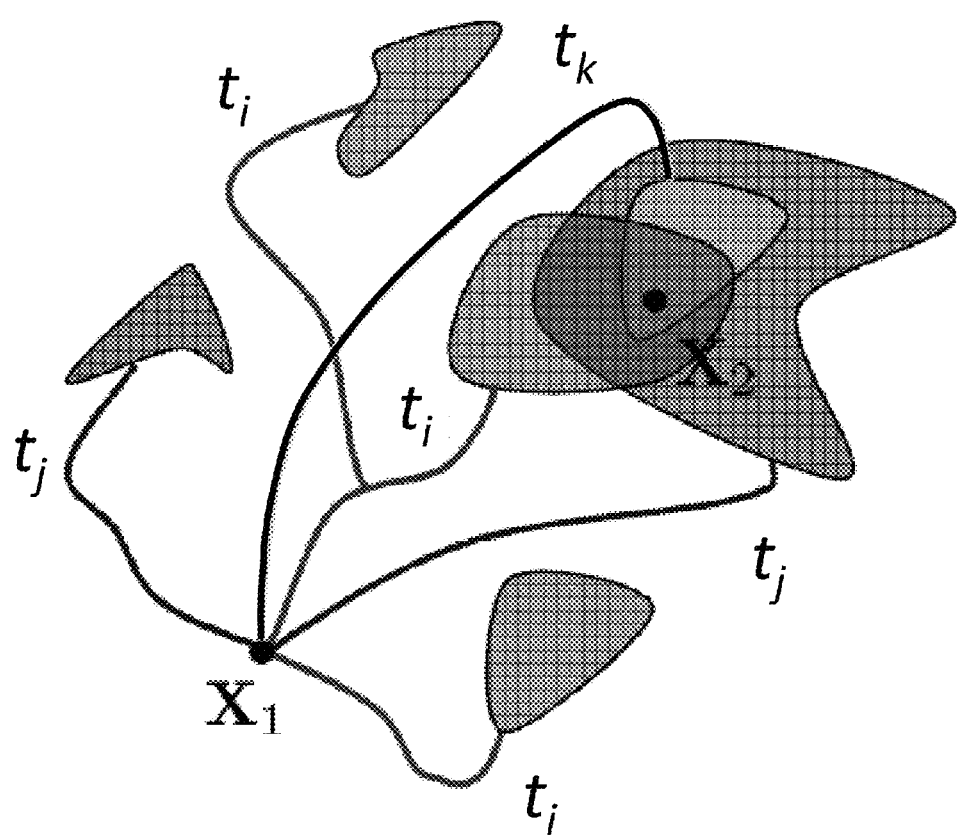
FIG. 7 illustrates a trace in accordance with an aspect of the present invention.

In general this is not possible without ambiguities. This is easy to see if one considers two locations in an image of constant gray level, where any spatial deformation will not present itself in the image texture. This means that a particular description of how to get from $X_1$ to $X_2$ might also lead to other locations $X_1 \neq X_2$. Abstractedly spoken, this partitions the image domain into two equivalence sets: the set of locations that can be reached by the description starting from $X_1$ and the set of locations that cannot be reached. The former is termed the feasible set of $X_1$ with respect to the particular description. This is visualized in FIG. 7.

Two different path descriptions from $X_1$ to $X_2$ possibly induce two different reachability equivalence sets. One can constrain the location of $X_2$ the most by considering all equivalence sets starting at $X_1$ that contain $X_2$. If the path descriptions are invariant to local smooth perturbations, then by construction the equivalence sets themselves as well as the constraint that the location of $X_2$ is contained in their intersection are invariant.

One further issue then is how to construct such an invariant path description. To this end it was already noted that smooth deformations do not change the topology of the domain, i.e. the local neighborhood structure is preserved. This is precisely what will be used to construct the invariant description by assuming only the preservation of local neighborhoods, but not global spatial relations.

The following section lays out the terminology and conceptual foundation in a continuous space. A following section describes a practical discrete approximation to the continuous model and how it is used to model a patch.

Continuous Profile Traces

The following simplifying assumptions are made for the initial construction of a representation in accordance with an aspect of the present invention. These will be relaxed in the discrete approximation later.

Pairs of continuous-space textured images I, I':$\square^2 \to \square$ are spatially related as in FIG. 6 by a continuous mapping H:$\square^2 \to \square^2$ with continuous inverse, i.e. a homeomorphism, and the brightness levels, contrast etc. do not change between the images.

Now, in the domain of the image I, every curve $\gamma$: $[0,1] \to \square^2$, with continuous velocity v that connects $X_1$ and $X_2$ (i.e. $\gamma(0)=X_1$, $\gamma(1) X_2$) has an equivalent curve $\gamma'(r)=H(\gamma(r))$ in the transformed image I' that connects the mapped points $X'_1=H(X_1)$ and $X'_2=H(X_2)$. The images I and I' along the curves $\gamma$ and $\gamma'$ respectively have the profiles $t(r)=I(\gamma(r))$ $(I \circ \gamma)(\neq )$ and $t'(r)=(I' \circ \gamma')(r)$ which are called profile traces (or simply traces for short, as opposed to the curve $\gamma$). The traces have the property that $t(r)=t'(r)$ at every point r because $t'(r)=(I' \circ \gamma')(r) (I' \circ H \circ \neq )(r)=(I \circ \gamma)(r) t(r)$.

In other words the traces t do not change under smooth deformations. This is a self-referential property as the deformation is exactly known in the construction of the trace t' and by itself not very useful as the curve $\gamma'$ is not directly observable. A weaker but ultimately more useful statement is that there exists some curve $\hat{\gamma}$ between $X'_1$ and $X'_2$ with the same trace $\hat{t}=I' \circ \hat{\gamma}$ t. This is strictly a weaker criterion as the underlying curves $\hat{\gamma}$ and $\gamma'$ are not necessarily the same. The existence property is not a function of H and thus invariant under H.

One goal is to restrict the true location of $X'_2=H(X_2)$ given the image I', a profile trace t and the location $X'_1=H(X_1)$. The following holds with regard to the location of $X'_2$:

Proposition 1. A necessary condition for any X' being the true location $X'=X'_2$ is the existence of a curve $\hat{\gamma}$ such that $\hat{\gamma}(0)= X'_1, \hat{\gamma}(1)=X'$ and the resulting trace $\hat{t}$ is equivalent to the trace t.

As a semantic shortcut in the following it will be stated that the location $X_2$ is related to the location $X_1$ by the trace t (and: $X'_2$ is related to the location $X'_1$ by the trace t). Due to the potential ambiguities mentioned earlier, in general many locations X are related to $X_1$ by the trace t. The set of these locations is what is called the equivalence set of the trace t given the location $X_1$. By construction, the induced equivalence sets for the traces are also invariant to H as each individual member of the set is defined in an invariant fashion.

The best the location of $X'_2$ can be restricted given $X'_1$ then is by the intersection of the feasible sets of all traces between $X_1$ and $X_2$ that start at $X'_1$: If $X_2$ is in the intersection of the feasible sets of all traces that lead from $X_1$ to $X_2$, then $X'_2$ is in the intersection of the feasible sets of the same traces starting from $X'_1$.

Prior Information on H

In practice there may be domain specific restrictions on the deformation H. The deformation of the curve $\gamma$ into $\gamma'$ changes not only its spatial location in the image domain, but also its velocity. If a particular prior can be shown to change the velocity within bounds, then these bounds can be used in the following fashion: The previous section defined the feasibility set via the existence of an image profile alone. In order to restrict the feasibility set to be consistent with the given prior, it is also required that the velocity of the curves associated with the profile to not differ more than the prior bounds on the deformation. This requirement will be explicitly used in the discrete approximation in a following section.

Discrete Texture Traces

Discretization

This section describes the discrete approximation of the trace model. Instead of relating two locations by a continuous image profile between them, they are related by a finite sequence of discrete, labeled nodes. The approximation comprises three different discretizations: (1) a discretization of the image domain to attain an enumerable set of possible discrete traces; (2) a partitioning of the neighborhood structure into a discrete set of possible relations; and (3) a quantization of the image texture in small neighborhoods by vector-quantization from a pre-computed code book.

One step is to discretize the image domain itself. The domain discretization allows to approaching texture traces as a discrete process by defining a finite set of locations along a trace. A practically dense set of locations in the image domain is chosen at which the image function will be evaluated.

Neighborhood relation discretization: One needs to define what neighborhood means in the discrete space. Naturally, two points have to be close enough to be considered neighbors. This is expressed by imposing a threshold on the Euclidean distance between two locations. According to the model provided earlier there are at least two components: the preservation of the neighborhood structure along a curve and bounds on the change of its velocity. The first implies that if two locations on the curve in one image are neighbors, then they are also neighbors in the other image. The second component implies that if two neighboring points on the curve have a particular angular relation in the image domain then this angular relation changes within bounds.

Two points also possess an angular relation in the Euclidean space whose change between images is limited by the prior over the deformations. Two points in one image that are neighbors and have a specific angular relation will be neighbors in the transformed image and their angular relation changes within bounds. The angular relation is quantized into a discrete set of possible values. While this potentially introduces aliasing, the quantization can be made very fine in principle.

Texture quantization and label multiplicity: The continuous profile trace model described above is based on the value of the image function at each location. This is highly susceptible to perturbations of the image function such as illumination changes or noise. In order to achieve greater robustness to these perturbations, the appearance of a small neighborhood around each point is considered. Again for computational purposes, the image texture in this small neighborhood is quantized into a discrete set to attain individual label identities for each location. Unless the quantization itself is rotation-invariant (e.g. based on histograms), one has to choose an orientation for the quantization. At this point two different approaches are followed: (a) using a fixed, absolute orientation in the image domain, or (b) estimating the locally dominant orientation from the texture.

The second option yields oriented traces whereas the first option yields non-oriented traces. The main difference is that the non-oriented traces will not be invariant to global rotation of the domain as the texture quantization changes with global rotation. The discretization possibly introduces aliasing effects at the bin boundaries and it will be shown empirically that those effects can effectively be addressed by allowing multiple labels for each location, where the most likely labels are selected first. This is called the label multiplicity m, i.e. the number of times that each node is repeated with a different label.

Discrete Texture Traces

Formally, there is a discrete set of locations or landmarks $x_i$ with discrete labels $l_i$, (or more than one label for label multiplicity m>1), a neighborhood relation between two locations $N(x_i, x_j)$ and a finite discrete set of angular relations $A_k(x_i, x_j)$ (see FIG. 9). FIG. 9 illustrates neighborhood and angular relations. The example location $x_j$ is related to the location $x_i$ by N and $A_3$. In general, two locations $x_i$ and $x_j$ are related by N if they are closer in Euclidean space than a fixed neighborhood scale threshold. They are additionally related by $A_\theta$ if they have the angular relation defined by the discrete parameter $\theta$.

The discrete approximation of the continuous profile traces can now be formalized. Due to the fact that texture is captured rather than individual lightness levels, the approximations are termed discrete texture traces (DTT).

Definition. A discrete texture trace is a finite sequence of label-relationship pairs $T=\{(l, \theta)_i\}$ of length n. Given a starting location $x_i$ it induces the feasible set of locations $x_j$ that are reachable from $x_i$ via the trace T. A location $x_j$ is reachable by T if there is a sequence of locations $(y_k)$ such that:
$N(x_i, y_1) \wedge N(y_1, y_2) \wedge \ldots \wedge N(y_{n-1}, x_j) \wedge A_{\theta_1}(x_i, y_1) \wedge A_{\theta_2}(y_1, y_2) \wedge \ldots \wedge A_{\theta_n}(y_{n-1}, x_j)$ and the locations $(x_i, y_1, \ldots, y_{n-1})$ have labels $(l_1, l_2, \ldots, l_n)$ respectively.

FIG. 8 illustrates this for the example DTT $T=((l_1, \theta_1), (l_2, \theta_2), (l_3, \theta_3))$ of length n=3, relating the locations $x_i$ and $x_j$. The DTT can be oriented or non-oriented, depending on the choice of texture quantization.

One compact definition of a discrete texture trace is: a finite sequence of pairs of label and spatial relations which induces a feasible set of locations that can be reached given a starting location.

The Trace Model for Patches

The discrete neighborhood structure and labeled landmarks induce a graph G=(E,V) with the landmarks as labeled nodes V and the neighborhood relations as edges E. In the case that the label multiplicity factor m is greater than one, each possible label for a particular landmark is assigned its own node in V. In other words, if there are q landmarks, the set of nodes V in the graph will have mq members.

The set of attributed adjacency matrices $\{A^{l\theta}\}$ of the graph G is defined as: preferably $a_{ij}^{l\theta} > 0$ and more preferably $a_{ij}^{l\theta} \neq 0$ iff the node i of label l has node j of arbitrary label connected to it by relation $\theta$ (as illustrated in FIG. 9 for $\theta$=3). Then the trace $T=\{(l, \theta)_i\}$ of length $n_d$ relates the nodes $x_i$ and $x_j$ exactly if there is an intermediate sequence $y_1, \ldots, y_{n_d-1}$ such that $$a_{(x_i, y_1)}^{(l\theta)_1} \left( \prod_{k=2}^{n_d-1} a_{(y_{k-1}, y_k)}^{(l\theta)_k} \right) a_{(y_{n_d-1}, x_j)}^{(l\theta)_{n_d}} > 0 \qquad (1)$$

The adjacency matrices A are sparse and the existence of such a sequence can be established efficiently via matrix multiplication.

A patch in the framework as provided herein in accordance with an aspect of the present invention is generated by the set of all texture traces that start at its center or target point. In the continuous case as provided earlier above this would essentially describe the complete image domain in a topological manner. For the discrete approximation there is an implicit finite support region. The finite support region may be given by the discrete trace length $n_d$ and a neighborhood relation scale. No scale apart from the neighborhood threshold has to be chosen. For computational reasons the start and end point are inverted and a patch is generated by the set of all texture traces that have its center or target point in their equivalence set, starting at any other location. Again, by construction this model is quasi-invariant to smooth deformations.

It is noted that the concept of a transformation being invariant or a measurable property of a signal or an image being invariant to a transformation is well known in the art. The invariance means that the measurable property of a signal or an image is invariant to a particular transform if the measured value does not change when the signal or image undergoes the transform.

The related concept of quasi-invariant transformation is also known in the art. A measurable property of a signal or an image is quasi-invariant to a particular transform if the measured value does not change significantly when the signal or image undergoes the transform. A formal definition of quasi-invariant measures is provided for instance in Xia Dao-Xing Measure and Integration Theory on Infinite-Dimensional Spaces, Academic Press, 1972, which is incorporated herein by reference.

The elements of a domain, which are called nodes herein, are used herein as patches of pixels or even a pixel in an image. It is contemplated that a domain can be defined for any signal in two or more dimensions. The dimensions may be spatial dimensions, such as 2D or 3D image data. However a domain may be defined over any type of dimension, including a time domain. Accordingly, a signal may be an image, or an electrical signal or an electromagnetic signal or any signal that has properties that can be defined within two or more dimensions.

Formally, a patch may be centered at location $x_i$ is modeled as the set $\{T\}$ of discrete texture traces that have $x_i$ in their feasible set for any other location $x_j$. Again this can be computed efficiently via sparse matrix multiplication. The goal of the inference then is to determine the likelihood or confidence for a location in a target image that its neighborhood is generated by a reference trace model. Statistical independence of the individual traces is assumed and a likelihood or confidence is defined as proportional to the number of traces in the target location that also occur in the reference patch, normalized by the absolute number of traces in the reference patch. This is the similarity measure that is used in all experiments.

Online Tracking with Discrete Texture Traces

Online tracking of objects under perturbations such as illumination and scale changes, occlusion, in-plane and out-of-plane rotation and motion blur is an important, yet challenging problem. In this section we layout how our representation can be used to address some of these challenges in an online tracking framework. Applying our representation to tracking merely requires to modeling the incremental updating step of the relevant texture traces. This set is called the active set M. It contains the set of discrete texture traces that currently define the patch model.

There are two model updating mechanisms:

a) In order to address gradual appearance changes, a record is kept of occurrence of individual traces T over the history of frames for the detected center or target point. The current active set for the detection on a new frame is determined by a fixed number of traces with the most often occurring chosen first.

b) Whenever the current model is lost during the tracking, i.e. the detection confidence drops below a threshold, the model is stored and a new model is initiated with the current location as center or target, as if the tracking is started freshly. At all times, all previous models are detected in order of creation and when the detection threshold is high enough for a particular model, the system is rolled back to this model and all newer models are removed.

It is noted that the term "center" is used above. This may be considered a term of convenience related to a patch. One may of course determine one or more traces to a location wherein that location is not the center of a patch. Accordingly, the term "center" may be replaced with "target". This indicates that the "target" point may be an actual geometric center of a patch or window. The "target point may also be a location which is not the geometrically determined symmetric center of a window or patch, but for instance has a weighted location.

Online tracking with discrete texture traces: general

1. Given a bounding box of the object in the first frame, determine the center point of the bounding box as the initial point to track. Or determine a location in the object to which discrete texture traces are to be determined.
2. Extract the set of traces or discrete texture traces that lead to this point as explained above and define this as the active set.
3. For each new frame:
(a) Compute a score with respect to the active set, preferably for all locations around a selected area in the image. One may call the score for such a window a score map.
(b) If the maximum score is higher than threshold $t_d$, update current center location with location of maximum score.
(c) If the maximum score is lower than threshold $t_d$, store the current active set as model $M_n$ and reinitialize the active set from the current location and frame as if starting fresh.
(d) Compute the score map for all stored models $M_0 \ldots M_n$, where $M_0$ is the oldest and $M_n$ the newest model. If the detection score for any model $M_i$: $0 \leq i \leq n$ is higher than threshold $t_r$, roll back to the oldest model that has a detection higher than threshold $t_r$, delete any newer models and update the current (center) location with the maximum of the oldest model.
(e) Extract the set of traces that lead to the current (center) point and increase their count in the active set.

There are different ways to initialize step (a). For instance, one may assume or calculate a speed of the target location between two frames. In one embodiment of the present invention one may apply a window around the target location that is large enough to capture the target location in the next video frame. One may also calculate a speed, such as an average speed, of the target location between succeeding frames and apply a window size that addresses the variation in speed. An estimate of the new target location in the next video frame can be computed and provided with a window to address uncertainties in the actual speed and to capture with a high probability the actual target location. A processor then can apply the active set of traces to all relevant locations within the window around the estimated target location to create a score or a score map.

Other steps and methods to initialize the score map are possible and are fully contemplated.

For instance below a linear predictive step is applied from a previously determined target location. Another way to determine or estimate a potential target location is to assume a center of an image to be that estimate and using the entire image as the search window or search area. In accordance with an aspect of the present invention, the processor would search the entire image for a maximum score in discrete texture traces.

A more formal version of the above steps is provided below:

Incremental tracking with discrete texture traces

1. Given an object's location $x_0$ in a first frame, extract the set $R=\{T\}$ of traces that lead to $x_0$. Set a counter C for all possible DTTs $T::C(T:)=1$ if $T: R$, 0 otherwise.
2. Define $i=0$, thresholds $t_d, t_r \in (0,1)$, active set size $n_a$.
3. For a new frame f:
(a) Predict or estimate $\tilde{x}_f$ linearly from $x_{f-1}, x_{f-2}$.
(b) Active set: Define active set $M^a$ as the $n_a$ DTTs with the highest count C(T). Ties are randomized.
(c) Detect: Compute a maximum of a detection function (such as a confidence map) based on $M^a$ at a dense set of locations in a window around $\tilde{x}_f$ and retrieve its maximum value $c_{max}$ and location $x_{max}$.
(d) Detected: If $cmax \geq t_d$, set $x_f = x_{max}$.
(e) Lost: Else, store current model C as $C^i$, increment i, reset all $C(T:)=0$.
(f) Old models: Compute maximum of the detection function (such as the confidence map) for stored models $C^0 \ldots C^i$ individually, as in (b)-(c).
(g) Revert model: If the confidence for any model $C^j$ is higher than threshold $t_r$, set $C=C^j$ for the lowest such j, set i=j and $$x_f = x_{max}^j.$$

(h) Update model: Extract the set of traces that lead to the current center $x_f$ and increase their count in C.

Firstly a detailed look is taken at synthetically perturbed data and examine the performance and invariance characteristics in comparison to geodesic intensity histograms (GIH, using the binaries provided by "[12] Haibin Ling and David W. Jacobs. Deformation invariant image matching. In ICCV 2005, volume 2, pages 1466-1473, 2005" with respect to Gaussian noise, in-plane rotation, scale and smooth non-affine deformations.

Secondly the challenging problem of incremental tracking under occlusion is tackled, in-plane and out-of-plane rotation and illumination change on realistic data.

Base Performance and Occlusion Behavior

Performance Metric: The detection rate used as metric for this part has been used prior in "[12] Haibin Ling and David W. Jacobs. Deformation invariant image matching. In ICCV 2005, volume 2, pages 1466-1473, 2005": For each pair of images, a set of key points was selected in the first image and establish their corresponding ground truth locations in the second image. The detection rate is defined as the number of correct matches relative to the total number of key points in the reference image.

Experimental Setup All synthetic experiments were executed with the tuning parameters: trace length of $n_d=3$, $n_\theta=4$ possible angular quantization bins with a bin size of $\pm\pi/4$ and scale of neighborhood relation N of 20 pixels.

These parameters were chosen empirically as a trade-off between performance and computation time. For smaller $n_d$ the performance drops significantly, larger $n_d$ become computationally challenging. A dense set of intermediate node locations was sampled uniformly in the image and their labels were assigned by calculating SIFT descriptors at a fixed scale of 15 pixels square around each node and quantizing them into a fixed code book of size $n_f=32$. For the oriented DTT, the orientation of the quantized patch is estimated as the major edge gradient orientation at the patch scale. The code book was determined by k-means from a set of descriptors gathered from a large image corpus unrelated to the test data. The GIH method was configured at $\alpha=0.98$.

A set of 20 images was randomly selected from the PASCAL VOC 2010 database as described in "[6] M. Everingham, L. Van Gool, C. K. I. Williams, J. Winn, and A. Zisserman. The pascal visual object classes (voc) challenge. *International Journal of Computer Vision*, 88(2):303-338, June 2010" and perturbed them to generate test images. Each of the five perturbation parameters: Gaussian noise, in-plane rotation, scale, occlusion and smooth non-linear perturbation were varied individually. For the stochastic parameters noise, occlusion and non-affine deformation three samples for each of the twenty images were additionally generated. The locally smooth perturbations were generated as multi-scale Perlin noise, varying the noise amplitude. FIG. 6 illustrates a sample of the smooth perturbations. The occlusions were generated by randomly replacing 16 pixels square blocks of the test image by salt and pepper noise until a certain occlusion percentage was achieved. It was found that the GIH performed significantly better if the images were smoothed with a Gaussian filter with a standard deviation of 0.75. As the herein provided method and the GIH do not require key point detection around 150 patch locations (centers) were sampled on a regular grid in the unperturbed image.

FIGS. 10-14 show the performance of the herein provided method as a function of the various perturbation parameters and of the GIH method. The oriented and non-oriented DTT perform similar except in the case of rotation, where the rotational invariance of the oriented DTT comes into play. In the other cases, the oriented DTT performs slightly worse than the non-oriented DTT which may be explained by the trade-off of the additional rotational invariance via possibly erroneous local orientation estimations. Both methods (oriented and non-oriented DTT) clearly outperform the GIH for higher noise levels and occlusion.

The noise performance may be explained by the smoothing of the underlying SIFT computation as well as the label quantization. The better occlusion behavior of the DTT may be explained by the voting-like confidence measure in the sense that an observed false-positive DTT does not negatively impact the result, but only non-observed reference DTTs impact the result by not voting. For small smooth deformations all methods perform similar, whereas the GIH outperforms both DTT versions for very large smooth deformations. This may be a result of the stricter invariance of the GIH to smooth spatial perturbations.

The DTT tracking method described herein earlier above was implemented on a computer and the performance of the non-rotation invariant DTT on eight challenging real-world sequences was compared to several state of the art methods. The rotation invariant DTT was not included as in-plane rotation is addressed by the incremental updating. The empirically selected parametrization of the DTT was $n_\theta=16$ possible angular bins with an orientation bin size of $\pm\pi/8$ and $n_f=32$ discrete labels at a trace length of $n_d=3$, resulting in $(n_\theta n_f)^{n_d} \approx 1.3 \times 10^8$ possible traces. A maximum number of about 0.3% of all possible traces was used as the active set size $n_a$, yielding a very sparse representation.

The scale at which to track was automatically chosen as the scale at which the initial set M is the largest, i.e. the scale where the most unique traces can be computed for the initial patch. The eight sequences have a wide range of perturbations including motion blur, in- and out-of-plane rotation, occlusions and illumination change (Table 1 in "[22] B. Liu, J. Huang, L. Yang, and C. Kulikowski. Robust tracking using local sparse appearance model and k-selection. CVPR, pages 1313-1320, 2011" lists those individually).

The two protocols from "[22] B. Liu, J. Huang, L. Yang, and C. Kulikowski. Robust tracking using local sparse appearance model and k-selection. CVPR, pages 1313-1320, 2011" and "[23] J. Santner, C. Leistner, A. Saffari, T. Pock, and H. Bischof. PROST Parallel Robust Online Simple Tracking CVPR, 2010" were used, and add to their comparisons respectively. The four sequences 'board', 'box', 'lemming' and 'liquor' of "[23] J. Santner, C. Leistner, A. Saffari, T. Pock, and H. Bischof. PROST Parallel Robust Online Simple Tracking CVPR, 2010" were evaluated by the PASCAL score of "[6] M. Everingham, L. Van Gool, C. K. I. Williams, J. Winn, and A. Zisserman. The pascal visual object classes (voc) challenge. *International Journal of Computer Vision*, 88(2):303-338, June 2010" against the current best performing SPT "[22] B. Liu, J. Huang, L. Yang, and C. Kulikowski. Robust tracking using local sparse appearance model and k-selection. CVPR, pages 1313-1320, 2011" as well as PROST of "[23] J. Santner, C. Leistner, A. Saffari, T. Pock, and H. Bischof. PROST Parallel Robust Online Simple Tracking CVPR, 2010", MIL in "[24] B. Babenko, M.-H. Yang, and S. Belongie. Visual tracking with online multiple instance learning. CVPR, pages 983-990, 2009", FragTrack in "[25] A. Adam, E. Rivlin, and I. Shimshoni. Robust fragments based tracking using the integral histogram. CVPR, 1:798-805, 2006", ORF in "[26] A. Saffari, C. Leistner, J. Santner, M. Godec, and H. Bischof. On-line random forests. In ICCV, pages 1393-1400, 2009" and GRAD in "[27] D. Klein and A. Cremers. Boosting scalable gradient features for adaptive real-time tracking In ICRA, pages 4411-4416, May 2011."

The herein provided incremental DTT tracking method was not compared against the GIH method as it is unclear how to extend the GIH method to tracking. The PASCAL score measures the percentage of frames where the ground truth and detection overlap sufficiently to imply a correct detection. The results are shown in the table shown in FIG. 15. The table shows the PASCAL score for the PROST sequences of "[23] J. Santner, C. Leistner, A. Saffari, T. Pock, and H. Bischof. PROST Parallel Robust Online Simple Tracking CVPR, 2010." The best and second best method are highlighted in the table of FIG. 15. The DTT method has a consistently high score and is on par with the SPT with an overall PASCAL performance of 95.5%.

Furthermore these four sequences and the four additional sequences 'david', 'girl', 'car' and 'faceocc2' were tested as in "[22] B. Liu, J. Huang, L. Yang, and C. Kulikowski. Robust tracking using local sparse appearance model and k-selection. CVPR, pages 1313-1320, 2011." Their protocol uses the average deviation of the detected center from the ground truth relative to the diagonal size of the bounding box. The results are shown in the tables of FIG. 16 in comparison to the same methods for the first four sequences and for the other four sequences in comparison to PROST, MIL, as well as TST in "[28] B. Liu, L. Yang, J. Huang, P. Meer, L. Gong, and C. Kulikowski. Robust and fast collaborative tracking with two stage sparse optimization. In ECCV, pages 624-637. Springer, 2010" and IVT in "[29] D. A. Ross, J. Lim, R.-S. Lin, and M.-H. Yang. Incremental learning for robust visual tracking IJCV, 77:125-141, May 2008." The DTT performs well compared to the recent SPT, particularly on the 'faceocc2' sequence which contains significant occlusion. The tables of FIG. 16 show average tracking errors relative to the diagonal size of a bounding box for different image sequences.

The accuracy of the DTT method on the 'box' sequence is limited by a lack of texture on the particular object. The run time of the DTT method is on the order of tens of seconds per frame in Matlab.

Oneshot Tracking

In order to get a better empirical understanding of the quasi-invariance properties of the DTT representation, the following question was asked: how far can one get in tracking with using only one frame for model building, i.e. no incremental updating of the model. This may be called one-shot tracking and it clearly stressed the invariance properties of any representation.

The same DTT tracking algorithm as provided earlier is applied but the active set after the first frame was not updated. Furthermore, all reference traces (i.e. $n_a = \infty$) were used, a confidence map was computed on the whole frame and the updating of $x_f$ was suspended if $c_{max} < 0.1$ (i.e. less that 10% of the reference traces could be detected).

For illustrative purposes a confidence map is provided herein. However, different methods exist to find a maximum or minimum (optimum) of a function that exists in a defined area. One method to find a minimum or optimum is by applying the gradient descent method which is a known first-order optimization method. For finding a maximum the method may also be called a gradient ascent method. One may apply discrete gradients to find an optimum. The gradient ascent and gradient descent approach are indicated herein as being a gradient technique.

Iterative methods such as gradient technique or line search are general optimization schemes that allow the finding of local or global minima and maxima of a discrete or continuous function. Starting from an initial solution that may be estimated or is a pre-determined location, the solution is refined stepwise. The initial estimate may be the solution from a simpler estimation procedure or chosen randomly. Iterative methods may use the first, second and any further derivative of the function, or no derivative. One other example of an iterative method is to apply the known pattern search method on the discrete texture traces.

First Estimation Step: The purpose of a first estimation step is to provide an initial estimate for the maximum-finding/optimization. One illustrative example provides a simple linear interpolation from the previous values. However, it should be clear that any estimation that gives a rough location of the target is applicable here, even if the estimation just consists of taking the center point in the image, disregarding any prior information.

Figures 14, 15:
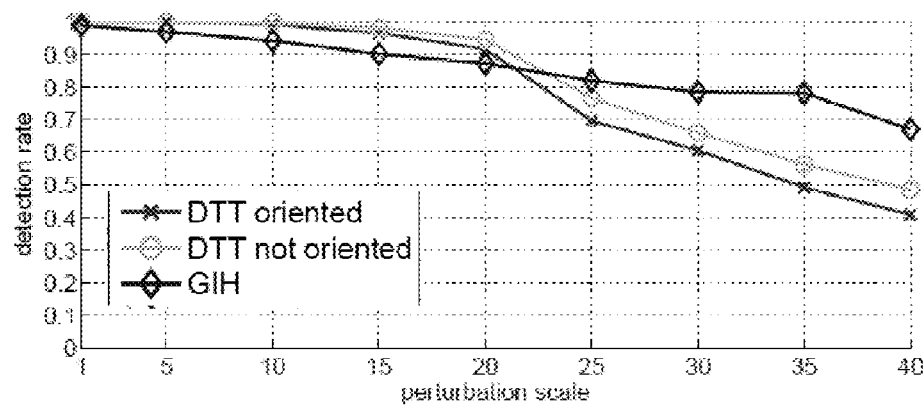

The resulting performance for the first four sequences is shown in the table of FIG. 15. When comparing the overall PASCAL performance of our one-shot method to the state of the art one can see that it outperforms four of the six compared methods. In other words, with just using one initial frame, our representation already takes third place out of seven, outperformed only by the recent GRAD and SPT methods.

Figure 1:
FIG. 1 illustrates object tracking in an image sequence in accordance with at least one aspect of the present invention.

To illustrate the performance of the DTT one-shot tracking, it was applied to the 'dudek' sequence in "[30] A. Jepson, D. Fleet, and T. El-Maraghi. Robust online appearance models for visual tracking IEEE PAMI, 25(10):1296-1311, 2003. FIG. 1 shows at the top left the initial image cropped around the marked ground truth location and several detections of the DTT algorithm throughout the sequence. One can see how the detected (center) point is always on the bridge of the nose between the eyes (as is the ground truth). FIG. 17 shows one frame and FIG. 18 the corresponding computed confidence map. The overall PASCAL performance on this sequence with the one shot tracking is 99.5%. The average distance between ground truth and detection is 2.5 pixels (or a ratio of 0.011 when measured as in the table of FIG. 16), indicating that the detections are very precise. The one-shot results are omitted for the table of FIG. 16 since outliers skew the average ratio significantly, rendering this particular comparison meaningless.

The methods as provided herein are, in one embodiment of the present invention, implemented on a system or a computer device. Thus, steps described herein are implemented on a processor, as shown in FIG. 19. A system illustrated in FIG. 19 and as provided herein is enabled for receiving, processing and generating data. The system is provided with data that can be stored on a memory 1901. Data may be obtained from a sensor such as a camera which or from any other data relevant source. Data may be provided on an input 1906. Such data may be image data or any other data that is helpful in a vision system. The processor is also provided or programmed with an instruction set or program executing the methods of the present invention that is stored on a memory 1902 and is provided to the processor 1903, which executes the instructions of 1902 to process the data from 1901. Data, such as image data or any other data provided by the processor can be outputted on an output device 1904, which may be a display to display images or data related to a tube inventory or a data storage device. The processor also has a communication channel 1907 to receive external data from a communication device and to transmit data to an external device. The system in one embodiment of the present invention has an input device 1905, which may include a keyboard, a mouse, a pointing device, one or more cameras or any other device that can generate data to be provided to processor 1903.

The processor can be dedicated or application specific hardware or circuitry. However, the processor can also be a general CPU or any other computing device that can execute the instructions of 1902. Accordingly, the system as illustrated in FIG. 19 provides a system for processing data resulting from a sensor, a camera or any other data source and is enabled to execute the steps of the methods as provided herein as one or more aspects of the present invention.

In accordance with one or more aspects of the present invention a novel approach for representing image patches has been provided, the discrete texture trace (DTT), that is quasi-invariant to local image deformations beyond affine transformations. Steps of various methods according to the novel approach have been implemented on a processor based system using controlled experimentation using synthetic datasets for a variety of perturbations including scaling, rotations, spatial Perlin noise as well as occlusions and additive Gaussian noise. It has been demonstrated that the provided novel representation can also be used to match object patches with large intra-class variations. The herein provided DTT representation is applied successfully to incremental and one-shot object tracking in image sequences.

The use of the texture trace model for patch modeling and localization has been demonstrated, other applications are contemplated. The trace model establishes a quasi-invariant topological relation between two image locations and is contemplated as a plug-in replacement for the Euclidean distance in higher level representations on a processor based image processing system.

Thus, novel systems and methods and steps implementing the methods have been described and provided herein for at least Topological Representation of Geometric Context in an Image by Discrete Texture Traces and object tracking using DTT representations.

A novel approach has been described for representing deformable domains such as image patches, the profile trace and a particular discrete approximation, the discrete texture trace (DTT). The DTT approach was validated under perturbations including scaling, rotation, spatial deformation, occlusion and Gaussian noise. Furthermore, a highly precise incremental tracking system based on the DTT representation that is on par with the state of the art has been provided. Indeed, even without incremental updating, the DTT already outperforms four of six trackers of the recent literature. All of this is achieved without heavy machine learning tools or sophisticated tracking modules. The DTT representation is highly parallelizable, lending itself to GPU implementations.

Apart from using the DTT as a basis representation in other domains such as object class detection, two immediate extensions of the DTT method are provided as additional aspects of the present invention. Firstly, the attributed adjacency matrices are not restricted to only encoding spatial and quantized appearance relations. Additional domain specific information such as motion in tracking or segmentations in object detection are straightforward to incorporate.

As an example, the prior assumption of common foreground motion in tracking can be encoded in the DTT model by including a particular relation in the adjacency matrices only if the neighboring locations have similar motion. This implies that a particular trace cannot cross a boundary with larger motion difference. This leads to motion consistent texture traces. Secondly, a trace relates the center location to another point on the patch. The actual observed configuration of the trace can then aid in reasoning about the scene geometry. For instance, the non-existence of a particular trace implies that any or all intermediate or end nodes are not observed.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

The following references provide background information generally related to the present invention and are hereby incorporated by reference: [1] J. Aloimonos. Shape from texture. *Biol. Cybern.*, 58(5):345-360, 1988. [2] B. Babenko, P. Dollar, and S. Belongie. Task specific local region matching. In *Computer Vision, 2007. ICCV 2007, IEEE 11th International Conference on*, pages 1-8, 2007. [3] Herbert Bay, Andreas Ess, Tinne Tuytelaars, and Luc Van Gool. Speeded-up robust features (surf). *Comput, Vis. Image Underst.*, 110: 346-359, June 2008. [4] S. Belongie, J. Malik, and J. Puzicha. Shape matching and object recognition using shape contexts. *IEEE PAMI*, 24(4):509-522, April 2002. [5] Hong Cheng, Zicheng Liu, Nanning Zheng, and Jie Yang. A deformable local image descriptor. In *Computer Vision and Pattern Recognition, 2008. CVPR 2008. IEEE Conference on*, pages 1-8, 2008. [6] M. Everingham, L. Van Gool, C. K. I. Williams, J. Winn, and A. Zisserman. The pascal visual object classes (voc) challenge. *International Journal of Computer Vision*, 88(2):303-338, June 2010. [7] Jonas Garding and Tony Lindeberg. Direct computation of shape cues using scale-adapted spatial derivative operators. *Int. J. Comput. Vision*, 17(2):163-191, 1996. [8] T. Kadir, A. Zisserman, and M. Brady. An affine invariant salient region detector. pages Vol I: 228-241, 2004. [9] L. Karlinsky, M. Dinerstein, D. Harari, and S. Ullman. The chains model for detecting parts by their context. In *Computer Vision and Pattern Recognition (CVPR)*, 2010 IEEE Conference on, pages 25-32, 2010. [10] V. Lepetit and P. Fua. Keypoint recognition using randomized trees. Pattern Analysis and Machine Intelligence, *IEEE Transactions* on, 28(9):1465-1479, 2006. [11] Tony Lindeberg. Feature detection with automatic scale selection. *Int. J. Comput. Vision*, 30(2):79-116, 1998. [12] Haibin Ling and David W. Jacobs. Deformation invariant image matching. In *ICCV* 2005, volume 2, pages 1466-1473, 2005. [13] David G. Lowe. Distinctive image features from scale invariant keypoints. *Int. J. Comput. Vision*, 60(2):91-110, 2004. [14] Jitendra Malik and Ruth Rosenholtz. Computing local surface orientation and shape from texture forcurved surfaces. *Int. J. Comput. Vision*, 23(2): 149-168, 1997. [15] J. Matas, O. Chum, U. Martin, and T. Pajdla. Robust wide baseline stereo from maximally stable extremal regions. In *BMVC*, volume I, pages 384-393, London, 2002. [16] K. Mikolajczyk and C. Schmid. Indexing based on scale invariant interest points. In *ICCV* 2001, volume 1, pages 525-531 vol. 1, 2001. [17] Krystian Mikolajczyk and Cordelia Schmid. Scale & affine invariant interest point detectors. *Int. J. Comput. Vision*, 60(1):63-86, 2004. [18] Dennis Tell and Stefan Carlsson. Wide baseline point matching using affine invariants computed from intensity profiles. In *ECCV* 2000, pages 814-828, London, UK, 2000. Springer-Verlag. [19] Tinne Tuytelaars and Luc Van Gool. Matching widely separated views based on affine invariant regions. *Int. J. Comput. Vision*, 59(1):61-85, 2004. [20] A. Vedaldi and S. Soatto. Features for recognition: Viewpoint invariance for non-planar scenes. In *ICCV* 2005, volume 2, pages 1474-1481, 2005. [21] Barbara Zitova and Jan Flusser. Image registration methods: a survey. *Image Vision Comput.*, 21(11):977-1000, 2003. [22] B. Liu, J. Huang, L. Yang, and C. Kulikowski. Robust tracking using local sparse appearance model and k-selection. CVPR, pages 1313-1320, 2011. [23] J. Santner, C. Leistner, A. Saffari, T. Pock, and H. Bischof. PROST Parallel Robust Online Simple Tracking CVPR, 2010. [24] B. Babenko, M.-H. Yang, and S. Belongie. Visual tracking with online multiple instance learning. CVPR, pages 983-990, 2009. [25] A. Adam, E. Rivlin, and I. Shimshoni. Robust fragments based tracking using the integral histogram. CVPR, 1:798-805, 2006. [26] A. Saffari, C. Leistner, J. Santner, M. Godec, and H. Bischof. On-line random forests. In ICCV, pages 1393-1400, 2009. [27] D. Klein and A. Cremers. Boosting scalable gradient features for adaptive real-time tracking In ICRA, pages 4411-4416, May 2011. [28] B. Liu, L. Yang, J. Huang, P. Meer, L. Gong, and C. Kulikowski. Robust and fast collaborative tracking with two stage sparse optimization. In ECCV, pages 624-637. Springer, 2010. [29] D. A. Ross, J. Lim, R.-S. Lin, and M.-H. Yang. Incremental learning for robust visual tracking IJCV, 77:125-141, May 2008. [30] A. Jepson, D. Fleet, and T. El-Maraghi. Robust online appearance models for visual tracking IEEE PAMI, 25(10):1296-1311, 2003.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims.

The invention claimed is:

1. A method for tracking an image of an object in a plurality of video frames, comprising:
   a processor determining in a first video frame in the plurality of video frames a set of discrete texture traces to a target location in a patch in the object in the first video frame to establish a reference model, the patch being generated by the set of discrete texture traces that connect to the target location from locations in a finite support region defined by a discrete trace length of a predetermined length n and a neighborhood relation scale and each discrete texture trace is a finite sequence of n quantized descriptions, wherein each quantized description includes a quantized description of a first location in the finite support region and a quantized description of a relation between the first location and a second location in the finite support region; and
   the processor detecting the target location in a second video frame by maximizing a score based on the reference model.

2. The method of claim 1, further comprising:
   the processor updating the reference model based on the detected target location in the second video frame.

3. The method of claim 1, wherein the score based on the reference model includes a relative number of discrete texture traces.

4. The method of claim 1, further comprising:
   the processor determining an estimate of the target location in the second video frame.

5. The method of claim 4, further comprising:
   the processor determining a location with a highest score in the second video frame by an iterative process as the target location in the second video frame.

6. The method of claim 4, further comprising:
   the processor determining a confidence map of a set of locations in a window around the estimate of the target location in the second video frame; and
   the processor determining that a highest score in the confidence map does not meet a threshold requirement.

7. The method of claim 6, further comprising:
   the processor making the target location of a preceding video frame the target location of the second video frame; and
   the processor determining a new set of discrete texture traces to the target location in the second video frame to establish a new reference model.

8. A method for image tracking in a plurality of video frames, comprising:
   determining a target location in a first video frame in the plurality of video frames;
   a processor extracting from an area in the first video frame with a defined size that includes the target location, a set of discrete texture traces of predetermined length in a patch from locations in the patch that are not previously detected keypoints to the target location as an active set of discrete texture traces; and
   the processor computing a score map of an area in a second video frame in the plurality of video frames based on the active set of discrete texture traces.

9. The method of claim 8, further comprising:
   the processor determining as the target location in the second video frame, a location with a maximum score in the score map.

10. The method of claim 9, wherein the maximum score meets a threshold scoring value.

11. The method of claim 8, wherein no location in the score map meets a threshold scoring value.

12. The method of claim 11, further comprising:
    the processor determining the target location of the first video frame as the target location of the second video frame;
    the processor storing the active set of discrete texture traces as a stored model; and
    the processor determining a new active set of discrete texture traces related to the target location of the second video frame.

13. The method of claim 11, further comprising:
    the processor computing a score map for the second video frame for each of one or more stored models; and
    the processor updating the target location of the second video frame if the computed score map meets the threshold scoring value.

14. The method of claim 8, wherein the score map is a confidence map.

15. The method of claim 8, wherein the score map is created by an iterative process.

16. A system to track an image of an object in a plurality of video frames, comprising:
    a memory to store data, including instructions;
    a processor enabled to execute instructions upon data retrieved from the memory to perform the steps:
      determining in a first video frame in the plurality of video frames a set of discrete texture traces of a predetermined length to a target location from trace locations in a patch in the object in the first video frame to establish a reference model, wherein the trace locations in the patch are not previously detected keypoints; and detecting the target location in a second video frame in the plurality of video frames by determining a score based on the reference model.

17. The system of claim 16, further comprising:
the processor enabled to update the reference model based on the detected target location in the second video frame.

18. The system of claim 16, wherein the score based on the reference model includes a relative number of discrete texture traces.

19. The system of claim 16, further comprising:
the processor enabled to determine an estimate of the target location in the second video frame.

20. The system of claim 19, further comprising:
the processor enabled to determine a scoring map of a set of locations in an area around the estimate of the target location in the second video frame; and
the processor enabled to determine a location with a highest number of discrete texture traces in the scoring map as the target location in the second video frame.

* * * * *